(12) United States Patent
Fallon (10) Patent No.: US 8,306,533 B2
(45) Date of Patent: Nov. 6, 2012

(54) METHOD FOR EXCHANGING CELL INFORMATION BETWEEN NETWORKS

(75) Inventor: Liam Fallon, Athlone (IE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 190 days.

(21) Appl. No.: 12/595,863

(22) PCT Filed: Apr. 16, 2007

(86) PCT No.: PCT/EP2007/053692
§ 371 (c)(1),
(2), (4) Date: Oct. 14, 2009

(87) PCT Pub. No.: WO2008/125147
PCT Pub. Date: Oct. 23, 2008

(65) Prior Publication Data
US 2010/0130203 A1    May 27, 2010

(51) Int. Cl.
*H04W 4/00* (2009.01)

(52) U.S. Cl. ............ 455/435.1; 455/436; 455/442; 455/560; 455/552.1; 455/422.1; 370/331; 370/338

(58) Field of Classification Search ........ 455/435.1–442, 455/560, 561, 524, 525, 422.1; 370/331, 370/338
See application file for complete search history.

(56) References Cited

U.S. PATENT DOCUMENTS

| | | | |
|---|---|---|---|
| 5,260,987 A * | 11/1993 | Mauger | 455/560 |
| 5,761,619 A * | 6/1998 | Danne et al. | 455/422.1 |
| 6,353,621 B1 * | 3/2002 | Boland et al. | 370/467 |
| 7,054,638 B2 | 5/2006 | Rune et al. | |
| 7,392,062 B2 * | 6/2008 | Kuriki et al. | 455/560 |
| 7,869,829 B2 * | 1/2011 | Kurokawa | 455/561 |
| 7,894,852 B2 * | 2/2011 | Hansen | 455/552.1 |
| 8,010,161 B2 * | 8/2011 | Umeda et al. | 455/561 |
| 8,149,733 B2 * | 4/2012 | Basu et al. | 370/254 |

(Continued)

FOREIGN PATENT DOCUMENTS

GB    2 387 294 A    10/2003
(Continued)

OTHER PUBLICATIONS

PCT International Search Report, mailed Dec. 17, 2007, in connection with International Application No. PCT/EP2007/053692.

(Continued)

*Primary Examiner* — Sharad Rampuria
(74) *Attorney, Agent, or Firm* — Potomac Patent Group PLLC (57) ABSTRACT

A controller, such as a base station or radio network controller, for a local cellular network or network segment comprising one or more local cells being served by at least one transceiver, the controller communicating with the local cell or cells and comprising controlling means for controlling said local cell or cells and register means for register and share information about the local cell or cells and their relationships and also register and share information about one or more external cells within at least one external cellular network or network segment and their relationships with the local cell or cells. The controller in particular comprises communication means for communicating directly with one or more neighboring controllers for the external cellular network or network segment, for sharing of the registered information about cells and their relationships. The present invention also relates to a method for said controller and a cellular network including said controller.

23 Claims, 9 Drawing Sheets

U.S. PATENT DOCUMENTS

| | | | |
|---|---|---|---|
| 8,208,929 B2* | 6/2012 | De Pasquale et al. | 455/442 |
| 2002/0028690 A1* | 3/2002 | McKenna et al. | 455/517 |
| 2002/0151304 A1 | 10/2002 | Hogan | |
| 2003/0190930 A1* | 10/2003 | Lim et al. | 455/560 |
| 2004/0043768 A1 | 3/2004 | Pelletier | 455/436 |
| 2008/0274738 A1* | 11/2008 | Li et al. | 455/435.1 |
| 2011/0026503 A1* | 2/2011 | Mueck et al. | 370/338 |

FOREIGN PATENT DOCUMENTS

| | | |
|---|---|---|
| WO | 98/23122 A2 | 5/1998 |

OTHER PUBLICATIONS

ETSI TS 132 652, V6.2.1 Digital cellular telecommunications system (Phase 2+); Telecommunication management; Configuration Management (CM); GERAN network resources Integration Reference Point (IRP): Network Resource Model (NRM) (3GPP TS 32.652 version 6.2.1 Release 6), Jan. 2006.

3GPP TS 32.652 V6.2.1 Technical Specification Group Services and System Aspects; Telecommunication management; Configuration Management (CM); GERAN network resources Integration Reference Point (IRP): Network Resource Model (NRM) Release 6, Jan. 2006.

3GPP TS 32.642 V6.6.0 Technical Specification Group Services and System Aspects; Telecommunication management; Configuration Management (CM); UTRAN network resources Integration Reference Point (IRP): Network Resource Model (NRM) Release 6, Mar. 2006.

3GPP TS 32.642 V7.1.0 Technical Specification Group Services and System Aspects; Telecommunication management; Configuration Management (CM); UTRAN network resources Integration Reference Point (IRP): Network Resource Model (NRM) Release 7, Mar. 2007.

* cited by examiner

METHOD FOR EXCHANGING CELL INFORMATION BETWEEN NETWORKS

TECHNICAL FIELD

The present invention relates to a controller, such as a base station or radio network controller, for a local cellular network or network segment comprising one or more local cells being served by at least one transceiver, the controller communicating with the local cell or cells and comprising controlling means for controlling said local cell or cells and register means for register and share information about the local cell or cells and their relationships and also register and share information about one or more external cells within at least one external cellular network or network segment and their relationships with the local cell or cells. The present invention also relates to a method for said controller and a cellular network including said controller.

BACKGROUND

A cellular network is a radio-based network made up of a number of cells. Each cell exists in a geographical area covered/served by one or more transceivers, positioned in a base station. The cells together cover different areas to provide radio coverage over a wider area than that of one cell. The cellular network comprises a number of fixed main transceivers (on base stations) and a number of distributed mobile transceivers which provides services to the users of the network.

A primary issue for a cellular network is the method used for signal distribution between transceivers. One common method is Time Division Multiple Access (TDMA), used in the GSM standard combined with Frequency Division Multiple Access (FDMA). FDMA limits the reuse of a particular frequency due to interference. This means that there must be at least one cell's gap between cells using the same frequency. Another method is Code Division Multiple Access (CDMA) used for instance in 3G standards. CDMA uses a wider frequency band to achieve the same transmission capacity. On the other hand, the frequency band can be used in all cells without any risk of interference. Multiple accesses means that a number of mobile transceivers can share the same communication channel (frequency). In GSM, TDMA allows up to eight time slots per frequency. Since each mobile operator has one unique radio frequency band, these signal methods are essential for using the frequency band as much as possible. Sometimes, the different methods are combined to give multiple channels (transceiver-to-transceiver communication) within the coverage of one cell.

The base station contains the transceivers, antennas and equipment for encrypting/decrypting communication with the base station controller (BSC) serving several base stations. In a UMTS (W-CDMA) the base station controller is known as the Radio Network Controller (RNC). Typically, the base station contains several transceivers to be able to serve several different frequencies within the band. The base stations serve/cover the different cells (geographical areas) of the cellular network and together build the complete network for a supplier. By using directional antennas on a single base station, each pointing in different directions, it is possible to sectorice the base station so that several different cells are served from the same location, using the same frequencies. This increases the traffic capacity of the base station whilst not greatly increasing the interference caused to neighboring cells.

The base/radio station controller controls and supervises a network or a network segment, a segment being a part of a network. The controller communicates with a large number of transceivers (either directly or through a communication device for a group of transceivers) and handles allocation of radio channels, receive data from mobile phones, control handovers (communication session passing from one cell to another) and being a link between the transceivers and the Mobile Switching Center (MSC). It sometimes even works as a full switching station handling the traffic. Through the MSC the voice traffic from the mobile phone is routed (after checking with the phone operator register if it is allowed) to the Public Switched Telephone Network (PSTN) using SS7 (a set of telephony signaling protocols). SS7 delivers cell mobile telephone call across the PSTN.

The base/radio station controller is a key element is a cellular network. It controls the network segment and controls handover and roaming. It also works as a node for the MSC. The controller is aware of the cells in neighboring networks and network segments to which it can hand over communication sessions. The controller keeps a record (list) of the external cells and keeps a geographical map (mapping) of which cells is its own cellular network that have relationship to those external cells. The relationship is held in the form of an object-oriented model. The 3GPP association specifies the standards for the different kind of network, such as GSM and UMTS (W-CDMA). In the 3GPP Technical Specifications 32.642 (V6.6.0) and 32.652 (V6.2.1) it is shown how the mapping is maintained by the base/radio station controllers so that they can keep track of external cells and the relationship of those cells to the controller's local cells within its own network. A local cell can have relationship with an external cell in its own kind of network or with an external cell in a different kind of network. Creating such a record (list) for a cell is complex and different algorithms are used together with input data from field measurements or computer predictions of radio wave propagation in the areas covered by the cells.

Information about the relationship between local cells (controlled by the same controller) and external cells (controlled by a different controller) is used in case of handover, which is the process for transferring ongoing communication sessions from one cell to another. One kind of handover is hard handover (in TDMA/FDMA) in which the session is transferred when the channel of the source cell releases it and then the channel of the target cell engages it. Another kind is soft handover (in CDMA) in which the channel of the source cell is retained and used for a while in parallel with the channel of the target cell. In this case the connection to the target is established before the connection to the source is broken. Reasons for handover is for instance a mobile phone moving for instance from a local cell to an external cell, lack of capacity within one cell, interference in case of FDMA/TDMA or changed moving behavior. A typical handover is when the session is redirected from one segment to another. As described later, each cell in a cellular network is assigned a list of potential target cells for handover Information about the relationship between local cells (within the same network) and external cells (within a different network) is also used in case of roaming, wherein the subscriber's mobile operator hands over the communication session in its own cellular network to another mobile operator's cellular network (the details of the roaming process will not be dealt with here). The two operators have an agreement that allows roaming and communication and subscription data is exchanged between their respective cellular networks when roaming. In some cases, roaming occurs is the home area of an operator due to a weak signal. Reasons for roaming are the need for a new operator to provide full geographic at start-up, international roaming due to country-based operators or networks of different technology. Roaming between networks of different technologies is a great challenge, and there are many standards in how to achieve interoperability between such networks.

The base station typically comprises a base station control function through which the base station controller controls the station and which also provides an Operations and Maintenance connection to the network management system. A network management system provides a package of end-user functions for the operation of the cellular network. The functions refer to operation and maintenance of the network at a higher level. Examples of such functions are:

1. Hardware management—continuously keep inventory of all hardware present.
2. Software management—installation, upgrade, configuration activities etc.
3. Configuration management—enables the operator to set, modify and examine configuration parameters and files.
4. Performance management—provides data on the network performance with respect to accessibility, retainability etc.
5. Fault management—handling, subscription and logging of alarms and event.

Network management software may in some cases be installed in any node in the network and provides a GUI (graphical user interface) for operation. The management system supports the day-to-day operation and maintenance procedures. The network management traffic is normally separated from user/signalling traffic, but is carried on the same physical links. The traffic can be thought of as logical or virtual links. Interfaces are used for providing the management communication with the network.

Figure 1:
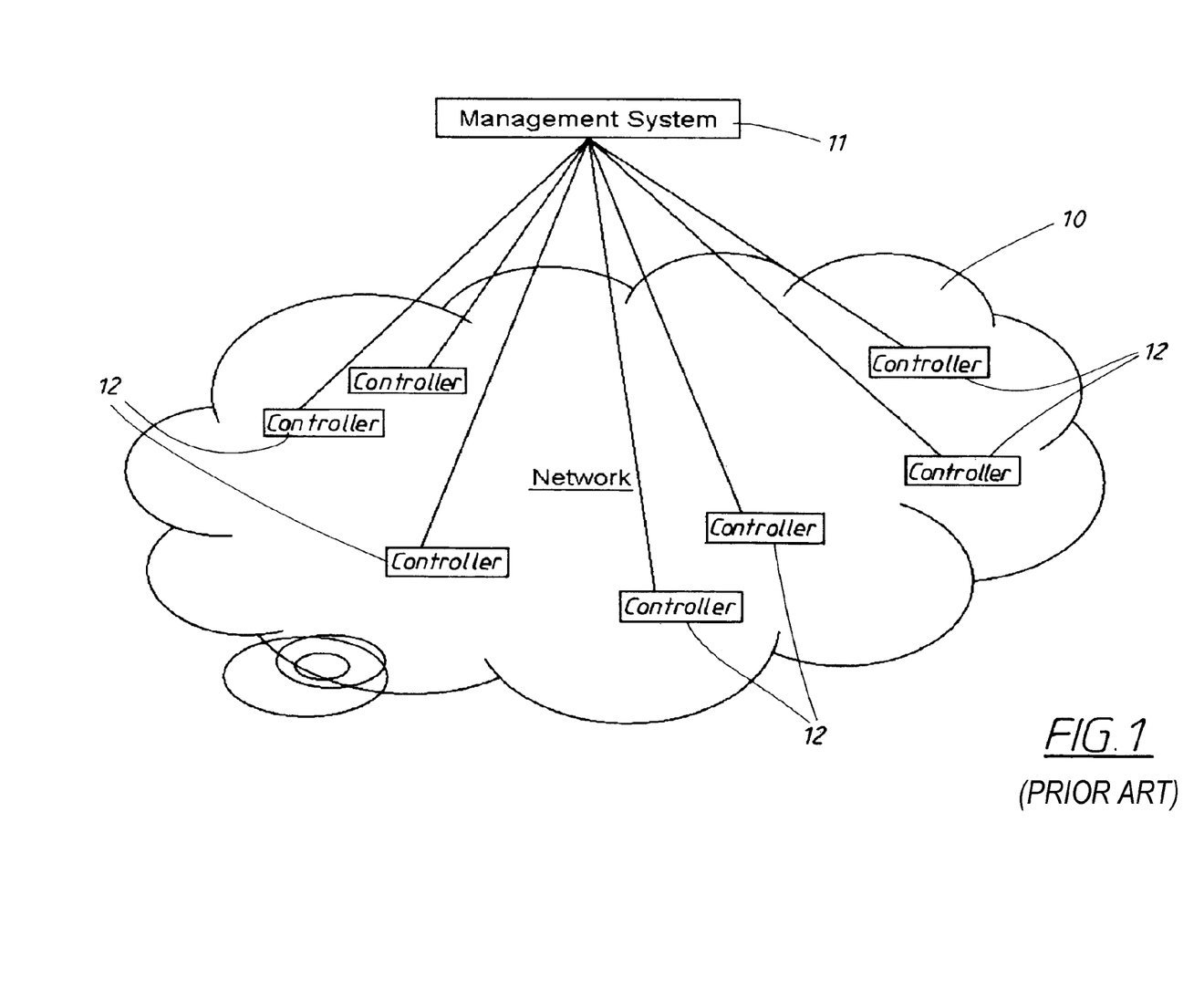
FIG. 1 schematically shows a known management system for controllers in a network.
Figure 2:
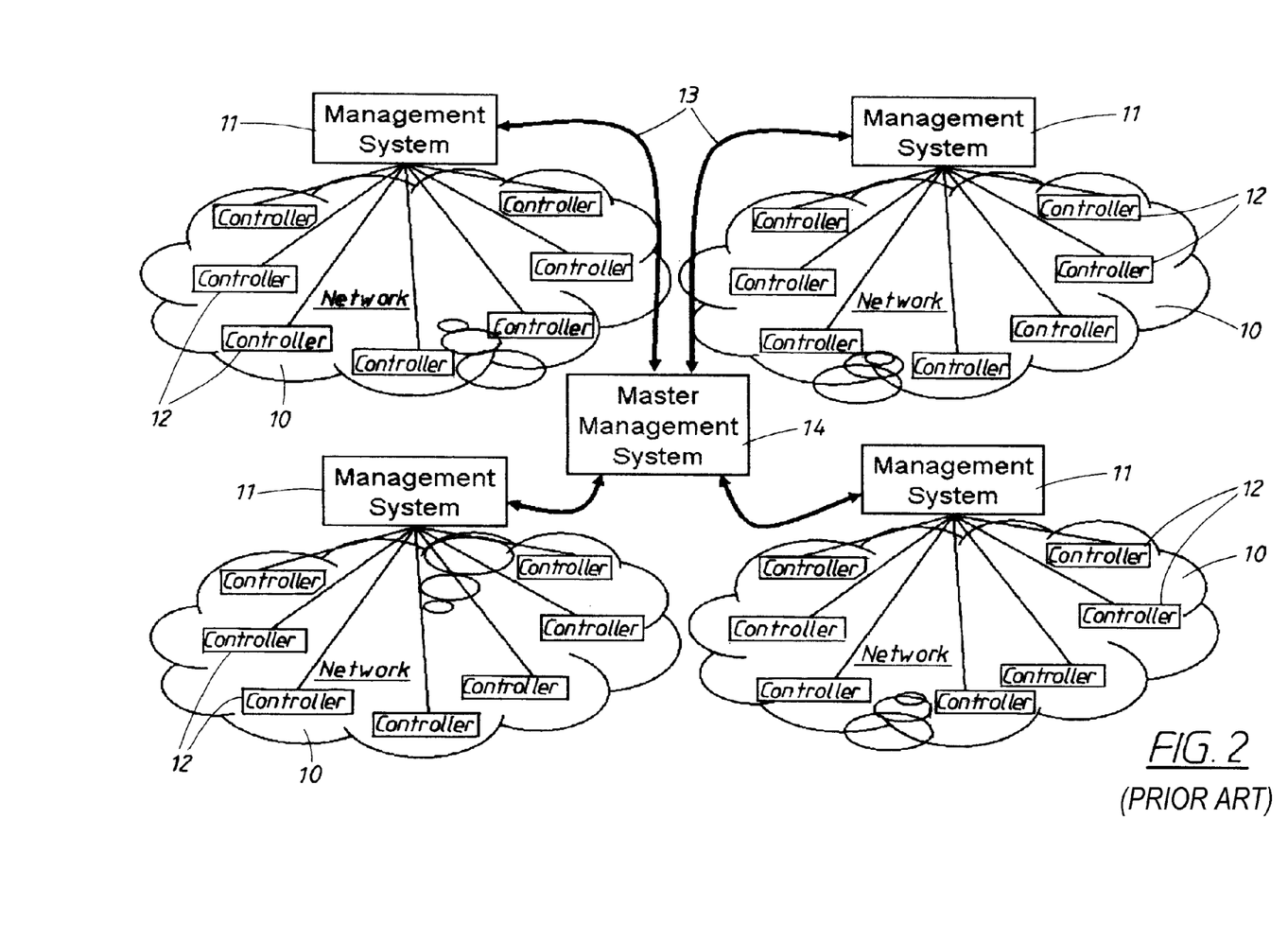
FIG. 2 schematically shows a known master management system for controllers in a network.

The management system 11 of a cellular network 10 (in large networks more than one system may be used) handles the configuration of external cells and the mentioned record (list) of the relationship with local cells in a particular base/radio station controller 12, see FIG. 1. Periodically, the system updates the external cell configuration in the controllers by the steps of:

1. Reading details of the local cells, external cells and their relationship from each controller
2. Reading details of the external cells and their relationship from each controller.
3. Using the data read to determine the optimum definition for external cells and their relationships from each controller.
4. Changing the configuration on each controller so that the external cell definition on that controller is optimal.

Where the cellular network has more than one management system 10, the systems either exchange information 13 about its respective controllers or passes it to a single master management system 14, see FIG. 2, which sets the configuration of all controllers.

There are some drawbacks with the existing record method for handover and roaming. In said drawbacks the external cell is a cell within a different network segment or within a different network:

1. The external cell and its relationships are set by the management system/-s and not by the network itself. This means that the configuration of respective cell and its relationships is managed external to the network manually by the management system. In case of more than one system, the management systems exchange information and cooperate to enable this or pass it to a master management system. If there is an inconsistency between the data in two or more management systems, these have to be resolved manually.
2. The external cell and its relations with local cells cannot adapt to changes in the network conditions, which means that it is not possible for the external cell and its relations to be defined and removed in an ad-hoc manner as new cells appear and disappear in the external networks or network segments or as load condition change in the networks.
3. The management systems runs its configuration task periodically, which means that the configuration for external and local cells and their relationships is only up to date at the time the last configuration was executed.
4. The network management system must be aware of external cells in all other networks which are adjacent to or overlapping the local cells they are managing. This means that management systems must exchange information and co-operate. As new networks (new operator and/or technology) the number and type of networks a management system must interact with increases dramatically.
5. The management system must be aware of all of the cell data in the network or networks they are configuring in order to calculate all the cell and relationship data. They must also be aware of the details of which network technologies can interact and how they interact.

As disclosed these are problems typical for a hierarchical management structure. There is only one single network management hierarchic topology in the network, which is static and represents the connectivity for the management systems of the network. The management systems have to interact fully and as said the difficulties in interaction increases with the number and kind of networks introduced. The systems are fully dependent on each other and the information they can share. A bad working interaction between two management systems will weaken the whole structure. Also, as said, the update of the relationships is static due to the structure and the periodicity of the configuration. One effect is that the development of management systems focuses more on the ability to monitor the cells of the networks than how to manage and provide better features for management.

SUMMARY

The object of the present invention is to solve the above-mentioned problems by providing an improved method for exchanging cell information between controllers of different networks or network segments.

The object is achieved by means of a network controller, such as a base station or radio network controller, for a local cellular network or network segment comprising one or more local cells being served by at least one transceiver. The controller communicates with the local cell or cells and comprises controlling means for controlling said local cell or cells and register means for register and share information about the local cell or cells and their relationships and also register and share information about one or more external cells within at least one external cellular network or network segment and their relationships with the local cell or cells. The controller is further characterized in communication means for communicating directly with one or more neighbouring controllers for the external cellular network or network segment, for sharing of the registered information about cells and their relationships. The object is also achieved by cellular network comprising one or more local cells being served by at least one transceiver, the network comprising such a controller.

The object is further achieved by means of a method for a controller, such as a base station or radio network controller, for a local cellular network or network segment comprising one or more local cells being served by at least one transceiver. The controller communicates with the local cell or cells by controlling said local cell or cells and register and sharing information about the local cell or cells and their relationships and also register and share information about one or more external cells within at least one external cellular network or network segment and their relationships with the local cell or cells. The method is further characterized in communicating directly with one or more neighbouring controllers for the external cellular network or network segment and sharing of the registered information about cells and their relationships.

The advantageous effects of the present invention is that when allowing the controllers themselves to exchange external cell and relationship data they can automatically add, keep track of and remove external cells and relationships from their record maps. The network itself further changes the configuration of external cells and relationships as network conditions change. External cells or relationships are defined and removed in an ad-hoc manner as new cells appear and disappear in an external or the local network and as load conditions change in network.

Further advantageous effects are that the configuration for the external cells and relations in a network is always up to date. It is not dependant on a network management task executed periodically. The management systems further need not to be aware of external cells in all other networks adjacent or overlaying the network they are managing. They only need to be aware of the address of the network controllers in the external networks. The management systems also do not need to be aware of the detailed cell data in the network or networks that they are configuring because it is not calculating the configuration data. They further need not to be aware of the details of which network technologies can interact and how to interact.

Other advantageous effect are that when a self forming management topology is used, the network management system does not even need to know the addresses of the controllers in the network for the purpose of handling external cells and relationships. Further, for the same use, the management system can keep track of changes in external cell and relation configurations on all controllers by subscribing for notification on the top controller in the hierarchical topology. The network management of external cell relationships becomes entirely passive.

BRIEF DESCRIPTION OF DRAWINGS

The present invention will now be described more in detail with reference to the appended drawings.

DETAILED DESCRIPTION

The system and method for carrying out the inventive network management will now be described with reference to an embodiment. The embodiment contains a number of features each contributing to the present invention. The embodiment described herein discloses a device and method for operating the device. It also includes a network including said device.

Figure 3:
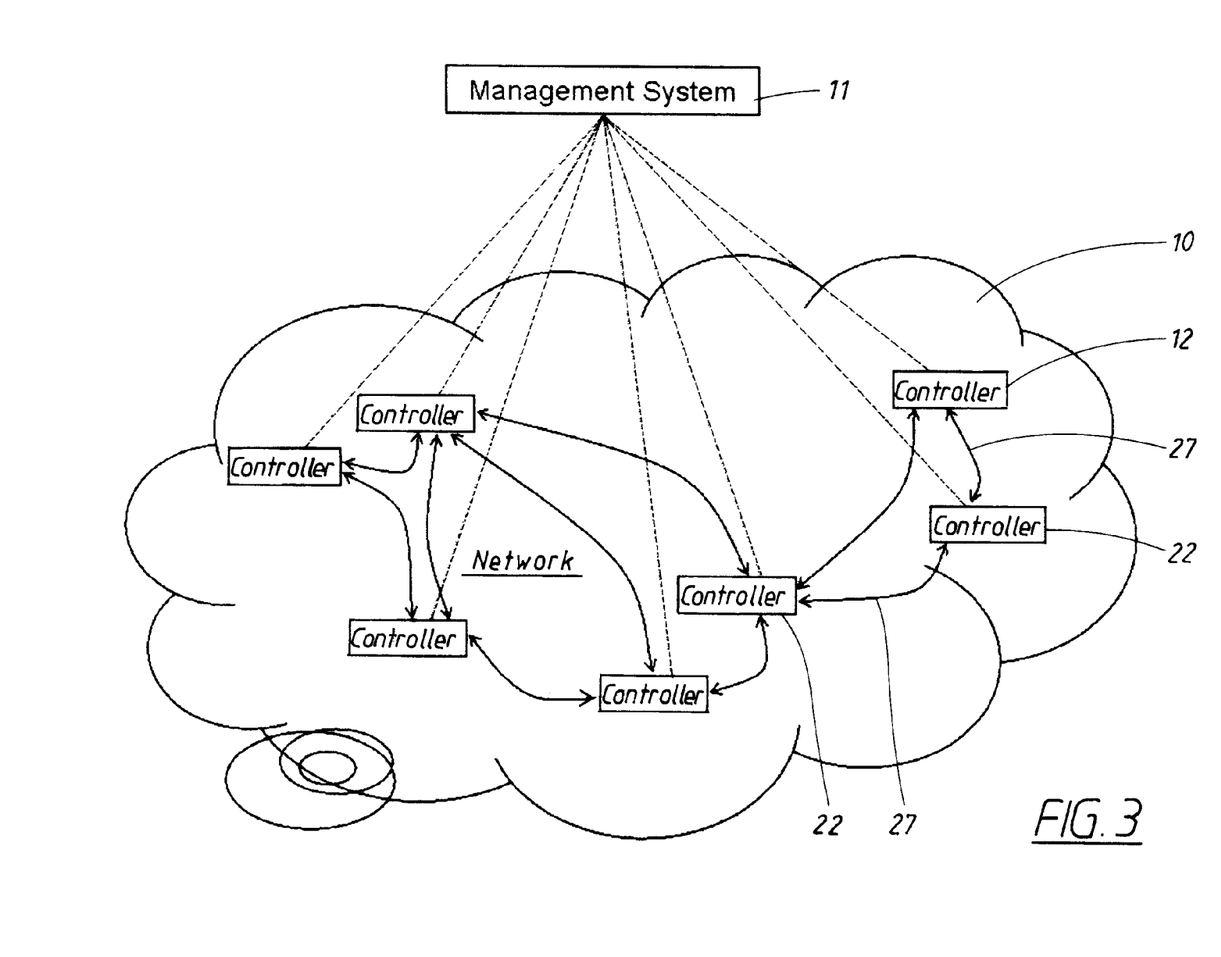
FIG. 3 schematically shows controllers exchanging external cell information in a network.
Figure 4:
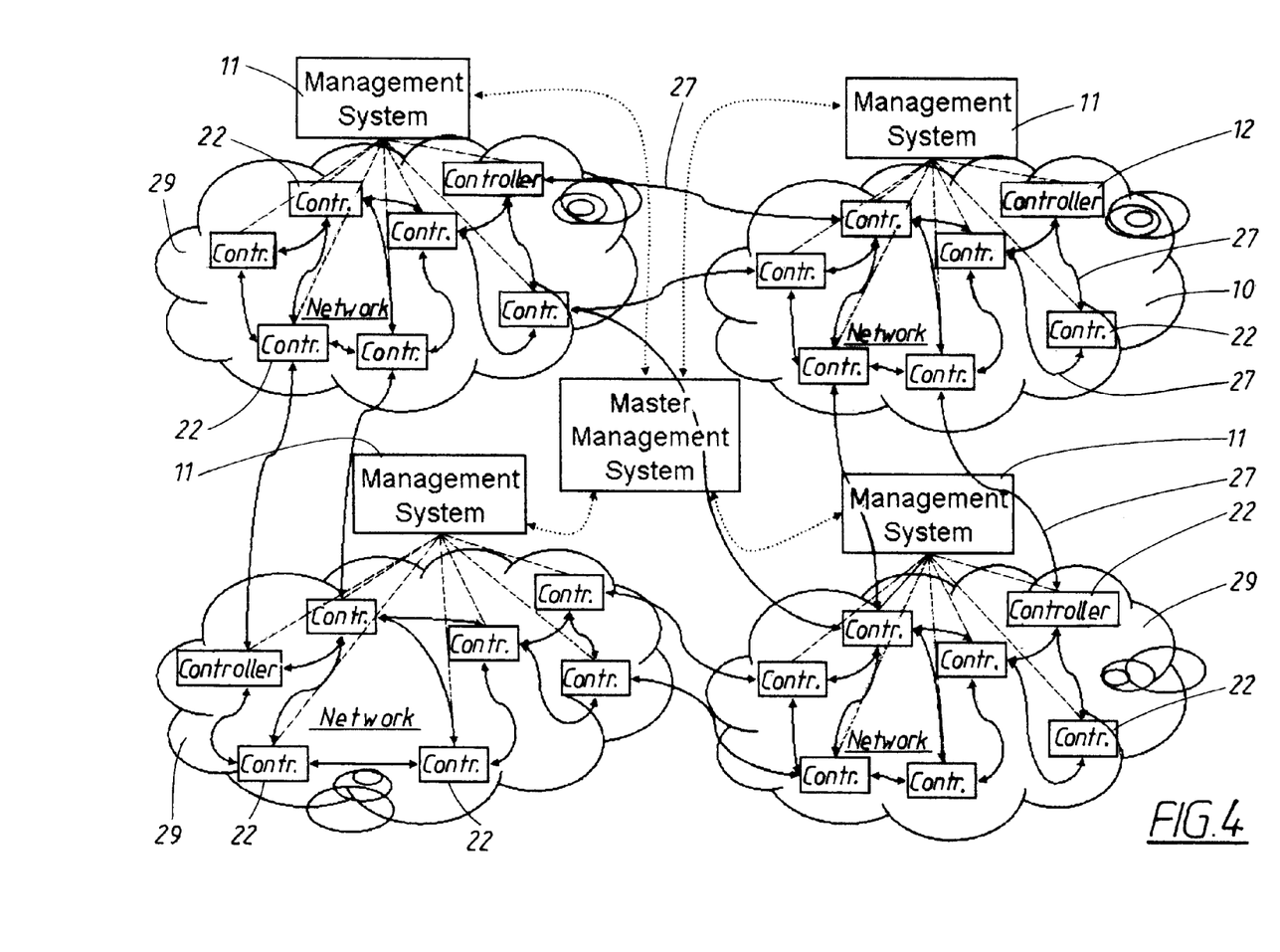
FIG. 4 schematically shows the external cell information exchange between different networks.

The embodiment comprises a controller 12, such as a base station or radio network controller, see FIGS. 3 and 4. The controller 12 may is normally located externally from the base station 15, see FIG. 9. The controller handles a lot of the tasks of a cellular network 10 or network segment as described in the background. The cellular network or network segments comprises one or more local cells 16 being served by at least one transceiver, see FIG. 9. Suitable cellular networks are mobile phone network such as GSM or UMTS.

Figure 9:
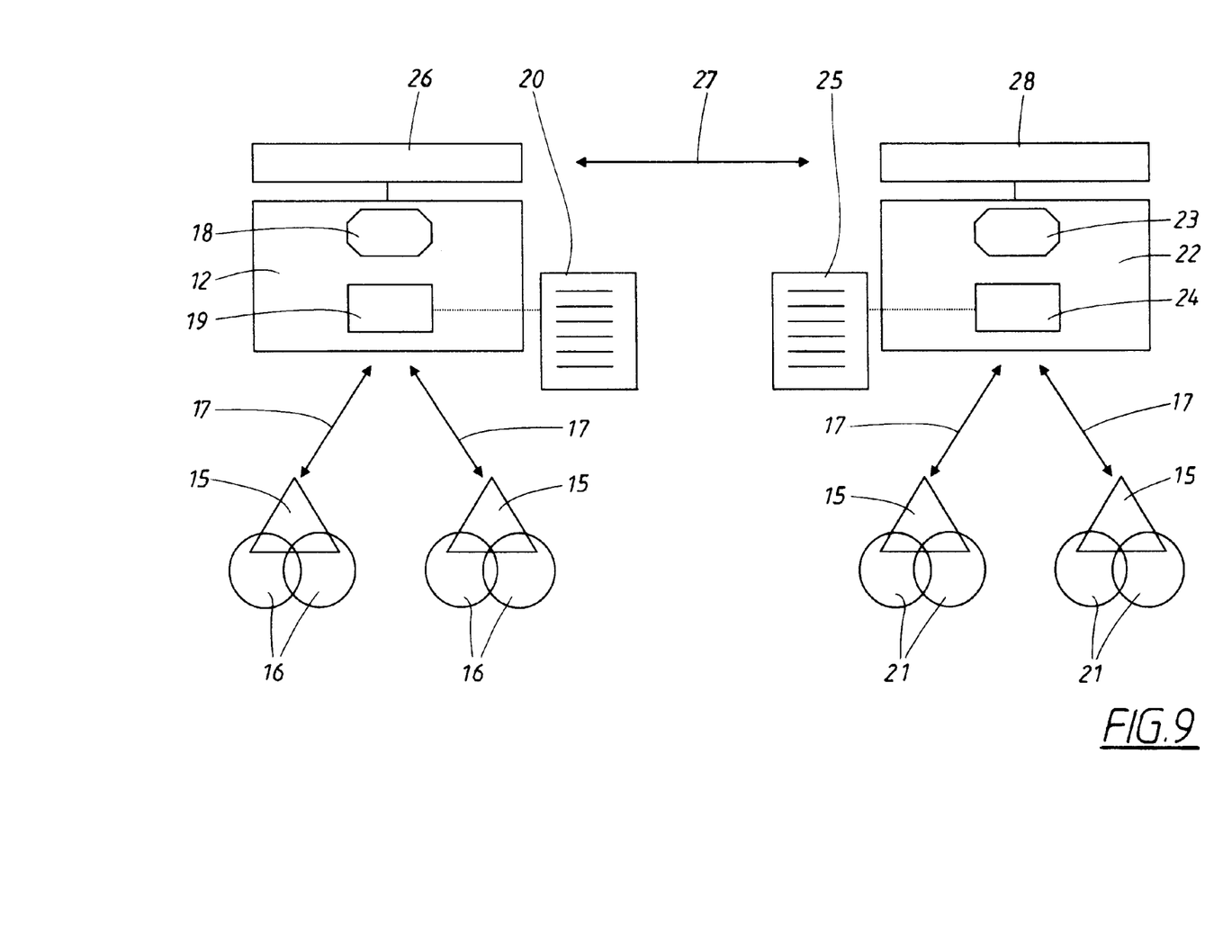
FIG. 9 schematically shows the controller according to the present invention.

The controller 12, see FIG. 9, communicates 17 with the local cell or cells 16 and contains controlling means 18 for controlling said local cell or cells. Said controlling relates to tasks described in page 3 of the background. The controlling means further comprises software for configuring cells.

The controller also contains register means 19, see FIG. 9, for register and sharing information 20 about the local cell or cells and their relationships. It further registers and shares information about one or more external cells 21 within at least one external cellular network 29 or network segment (not shown in FIG. 3, 4) served by a neighbouring controller 22 and their relationships with the local cell or cells 16. Network segment are part of the same network, and the controllers 12 and 22 each serves a network segment. The register information is used for handover and roaming of communication sessions between cells of different networks or network segments. The second controller preferably comprises the same type of controlling means 23 and register means 24 for register and sharing information 25.

In the present embodiment, see FIG. 9, the controller 12 further comprises communication means 26 enabling a direct communication 27 with the neighbouring controllers 22 operating in external cellular network 29 or network segments, also having the same type of communication means 28. The communication means preferably consists in protocols and address information about the neighbouring controllers enabling said direct communication. See also FIGS. 3 and 4, which schematically shows the direct communication for exchanging external cell information in a network or between networks.

The direct communication 27, see FIGS. 3,4 and 9, is established for sharing of the registered information 20 about cells and their relationships. The sharing of information is as described earlier intended for the record-keeping in the register means of local 16 and external 21 cells. A geographical map is kept of which cells in its own cellular network 10 that have relationship to those external cells. The relationship is held in the form of an object-oriented model.

The inventive concept of the present invention is to allow the controllers 12 (22) themselves, see FIG. 9, using its controlling 18 (23) and register 19 (24) means, to exchange external cell and relationship data 20 (25). Thereby they can automatically add, keep track of and remove external cells 21 (16) and relationships 20 (25) between cells from its register means 19 (24). They can also co-ordinate said activities between the local controller 12 and neighbouring controllers 22. The activities are based on the registered information 20 (25) being exchanged. As described later, a management overlay 11 may also be used that allows them to keep track of the relationships. The references between brackets illustrates that any controller can be the local controller. From now on the reference will mainly be to the controller 12, but the skilled person should realize that any of the neighbouring controllers 22 may also comprise the same functionality. All the advantageous effects are disclosed in the Summary part.

The register means 19, see FIG. 9, in the controller 12 holds information 20 about the neighbouring controllers 22 for the external cellular network 29 or network segment. The information relates to address information and other information that allows the controllers 12, 22 to communicate with each other.

The register means 19, see FIG. 9, of the controller 12 also holds information 20 that specifies the conditions that a cell 21 within an external network 29 or network segment must comply with in order to be registered as an external cell in the register means. The information relates to a set of parameters such as physical distance between cells having relationships, the total number of external cells that the cell has relationships with or in case of relationships between cells of different networks for instance requirements about technology of that network. Thereby, the cells can add, keep track of and remove external cells and relationships between cells from its register means.

Figure 6:
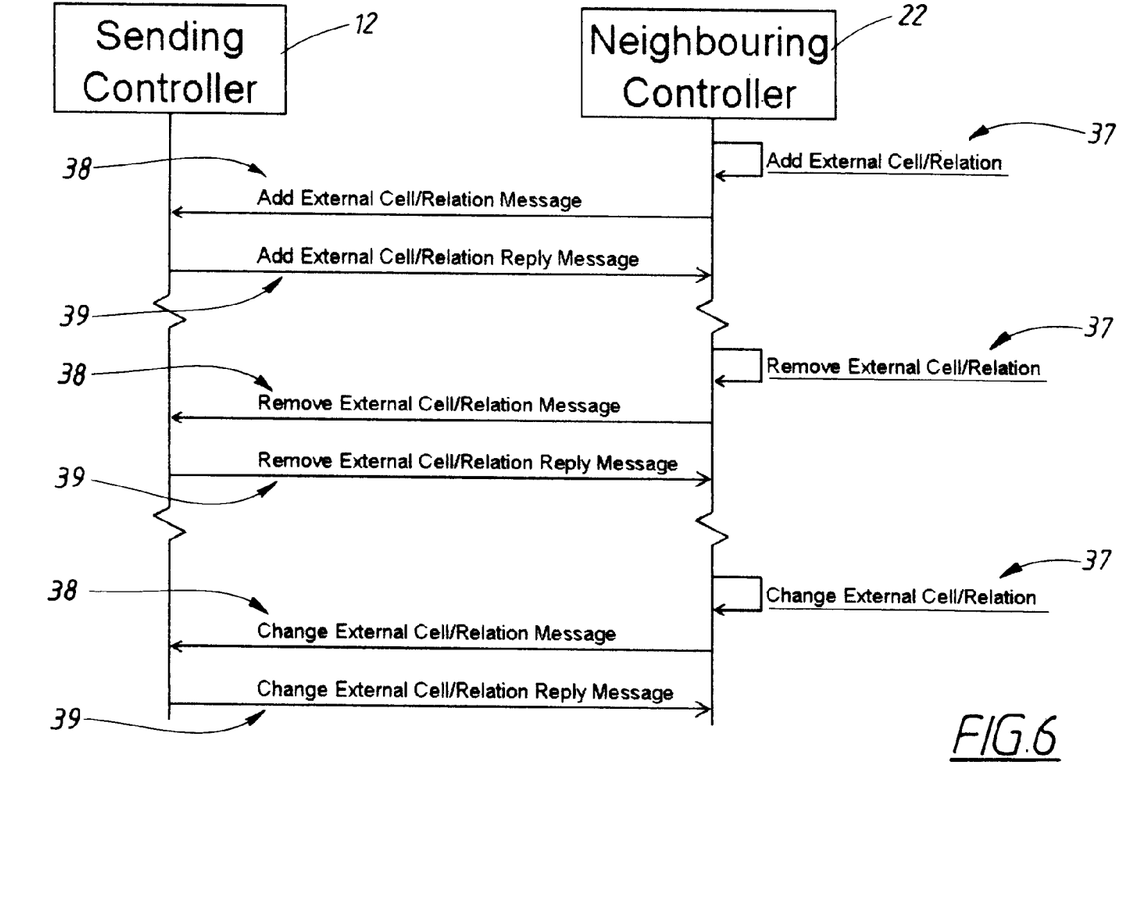
FIG. 6 shows a message exchange between controllers for addition, removal or exchange of external cells.

In case there are networks for different wireless technologies and networks from different operators, the controllers cooperate to exchange cell information as shown in FIG. 6. The method itself for information exchange is described further above and later in this specification. The difference in this case is that the management systems co-operate with each other in order to determine the list of neighbouring controllers for each controller, together with address information and other information that allows the controllers to communicate with each other. The list of neighbouring controllers for each controller may now contain controllers that are not part of the same network as a controller and may even be from a network of a different technology type than that of the controller.

The management systems 11 also cooperate to define a set of parameters on each controller 12 that specifies the conditions that an external cell 21 from a different technology or network 29 must comply with in order to be accepted as an external cell on a cell of a controller 12. Such parameters may include the same parameters as those used in a single network case or may contain extra parameters to deal with intra network and/or intra technology cases. An example of such a parameter might be that an external cell from a technology with inferior characteristics is only accepted as a cell for a superior technology if that cell is the only option for handoff in a given situation.

Figure 7:
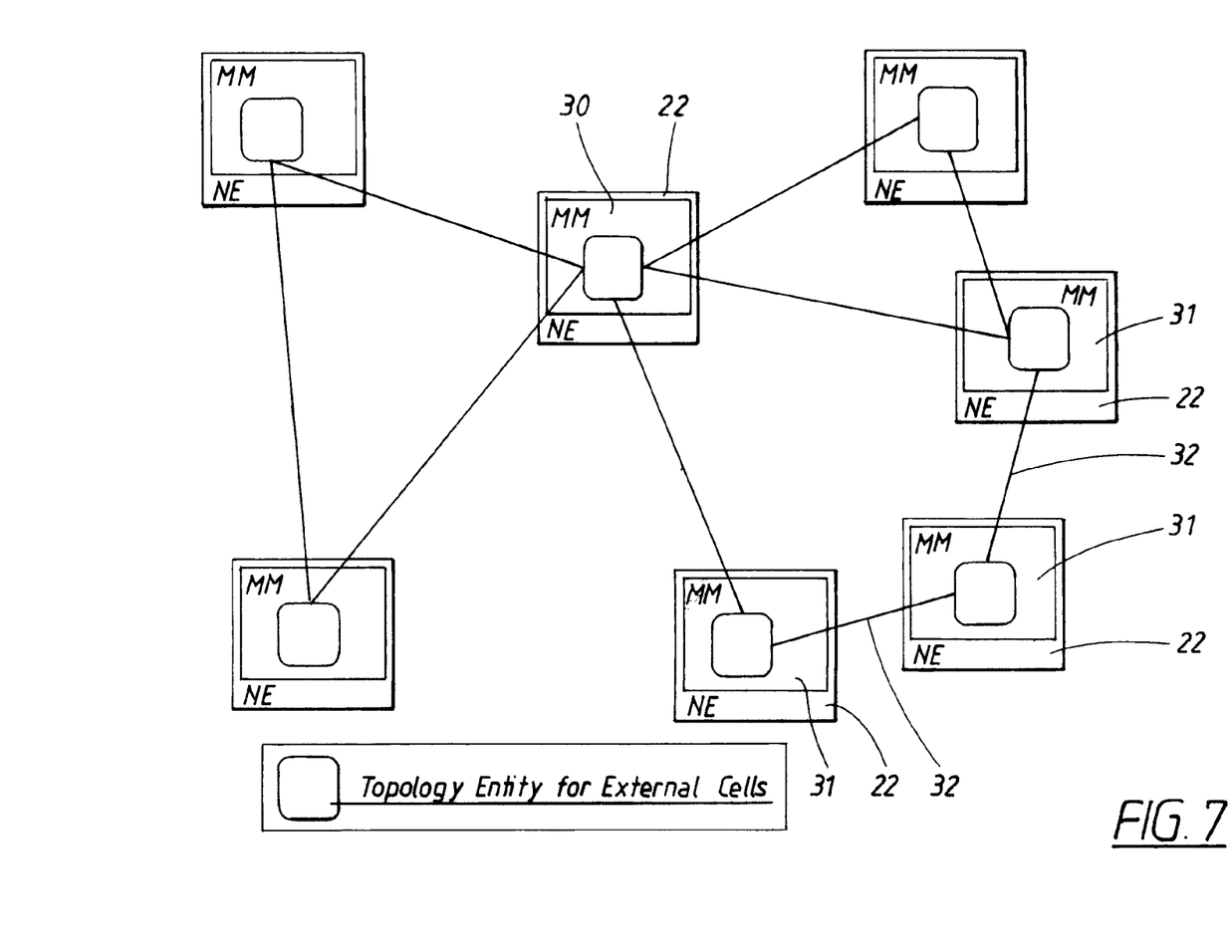
FIG. 7 schematically shows an external cell self forming topology.

In one embodiment, network management software 30 (31) is contained and run on the controller 12 (22) to allow said exchange of information, see FIG. 7 that schematically shows an external cell self forming topology. In this embodiment, the controlling means 18 is further able to form reform and/or terminate the topology for the management function of controlling, registering and sharing information about cells and their relationships with the neighbouring controller or controllers. The register means is able to register and share information about the topology for the management function. The topology is formed, reformed and terminated based on parameters that are set by part of the network management system for the local cellular network. The management module (MM) is contained and run on the controller to hold the management software and the controller works as a network entity (NE).

A network management topology is a pattern of links 32 connecting the controllers for the management function of controlling, registering and sharing information about cells and their relationships with the neighbouring controller or controllers. Well known management systems today use a layered management topology forming a hierarchy.

The forming, reforming and/or terminating the topology is controlled by role controllers such as leader role controllers and member role controllers being contained and run in the controller. Such role controllers are software based features of establishing the roles of controllers within a group and are will known. The role controllers controls the permission for the controller to perform controlling, registering and sharing information about cells and their relationships with the neighbouring controller or controllers. In a preferred embodiment a management module is run on the controller, the module comprising the network management software 30, 31.

In the cellular networks the controllers 12, 22 are formed into a topological group 33. One controller in the group has the role of a group leader for this group, wherein the group leader coordinates and displays the topology of its group for other controller's management software. The controller can appear in more than one position in the topology which means that it can be group leader for one group in one layer of a hierarchical topology and group member in a higher layer. This means that in a hierarchic topology, the controller in one topology layer is group leader for a topological group of controllers on the level below, wherein the group leader of the highest topological group represents the entire network for the management function.

Figure 8:
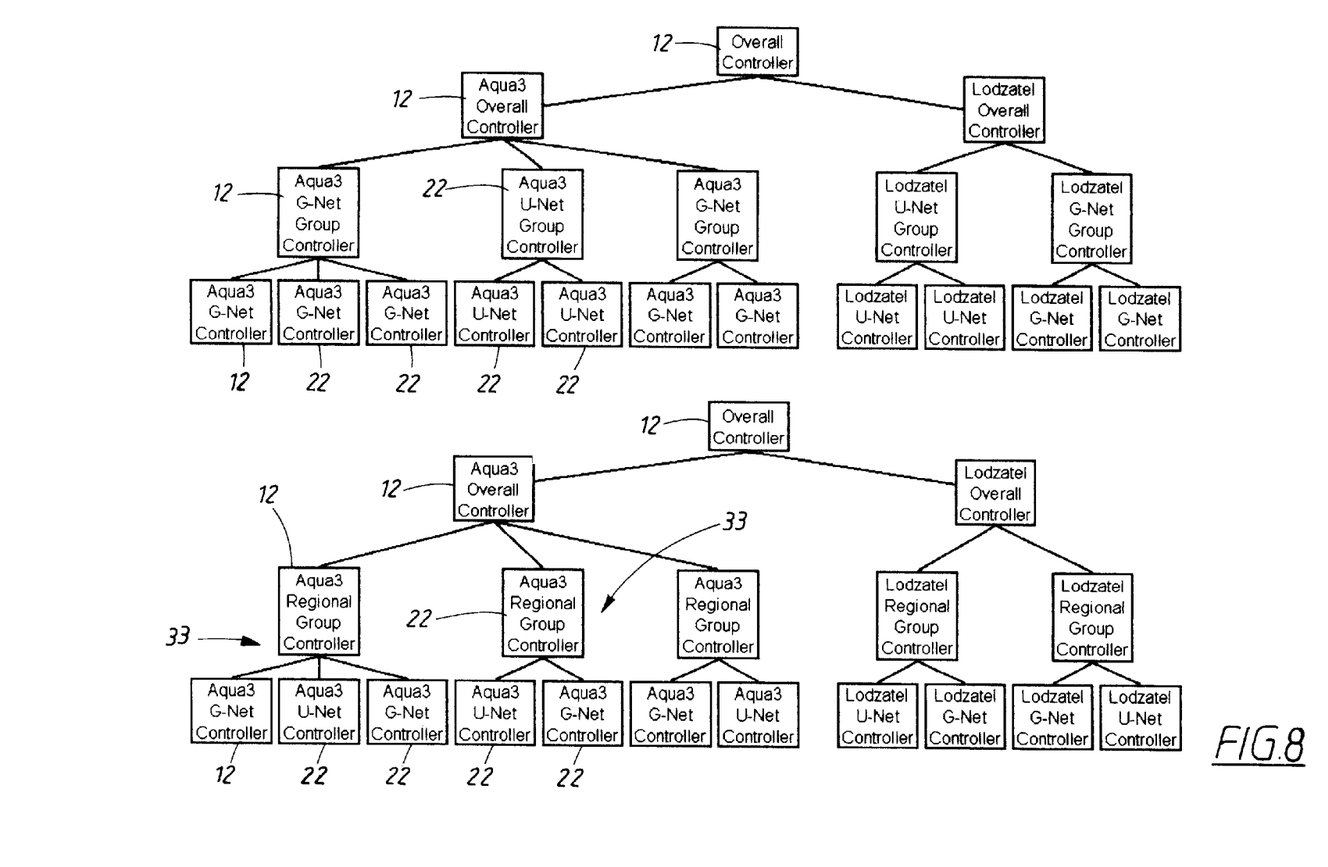
FIG. 8 shows examples of external cell relation hierarchy.

In one example (see FIG. 8, top hierarchy) the hierarchic topology is formed, reformed and terminated by the management software on the controllers so that topology groups in the lowest layer always comprises controllers 12, 22 for networks or network segments (U-Net, G-Net) that are geographically adjacent. Furthermore, groups in the next layer in the topology comprise controllers for networks or network segments that are heterogeneous and are operated by the same network operator (Aqua3, Lodzatel). Finally, groups in the next layer in the topology comprise controllers for networks that are operated by different network operators.

In another example (see FIG. 8, bottom hierarchy) the hierarchic topology is formed, reformed and terminated by the management software on the controllers so that groups in the lowest layer in the topology comprises controllers for networks or network segments that are heterogeneous and are operated by the same network operator (Aqua3, Lodzatel) in a geographic location. Furthermore, groups in the next layer in the topology comprise controllers for networks or network segments that are operated by the same network operator, grouped into regional or national groups (Regional). Finally, groups in the next layer in the topology comprise controllers for networks that are operated by different network operators.

Further examples, such as a flatter topology or a topology with more layers are also within the scope of the invention.

The method for sharing information registered in the controller 12 of the local network 10 or network segment comprises the known steps of controlling said local cell or cells 16 and register and sharing information about the local cell or cells and their relationships and also register and share information about one or more external cells 21 within at least one external cellular network 29 or network segment and their relationships with the local cell or cells. In accordance with the present invention the controller 12 communicates directly with one or more neighbouring controllers 22 for the external cellular network or network segment and sharing of the registered information 20 about cells and their relationships.

A network management system 11 for the local network 10 defines information about neighbouring controllers 22, together with address information and other information, which information is registered by the controller 12. As mentioned earlier the information is used for establishing the direct communication 27. The network management system further defines a set of parameters that specifies the conditions that a cell 21 within an external network 29 or network segment must comply with in order to be registered as an external cell in the register means 19, which parameters being registered by the controller. This is used by the controller to define how the controlling, registration and sharing of cells should be made.

If there are external cells 21 in another network 29 or network segment having another network management system, the system 11 of the local network 10 co-operates with the network management systems 11 for that external network 29 or network segments to define information about neighbouring controllers 22, together with address information and other information. The can also co-operate to define a set of parameters that specifies the conditions that a cell within an external network or network segment must comply with in order to be registered as an external cell.

According to the method, when the controller 12 starts operating or when a local cell 16 is added to or removed from the controller or when the characteristics of a local cell change 34, the controller sends the registered information 35 (Local Cell List Message) with its location and characteristics data to the one or more neighbouring controllers 22. See also FIG. 5 showing the sending of the information (updated cell list) to other controllers.

This is an important session to establish the possibility of updating cell information in each controller about the status of the external cells it has registered in its register means. When the controller receives registered information with location and characteristics data from a neighbouring cell it performed the steps of:
- examining the location and the characteristic data for each cell in the registered information received,
- determining if that cell should be registered as an external cell in its own registered information, or if it is already registered as an external cell should be removed as an external cell,
- determining if any cell in the registered information received, which it has registered as an external cell in its own registered information, is missing and if so removing the cell from its registered information.

Figure 5:
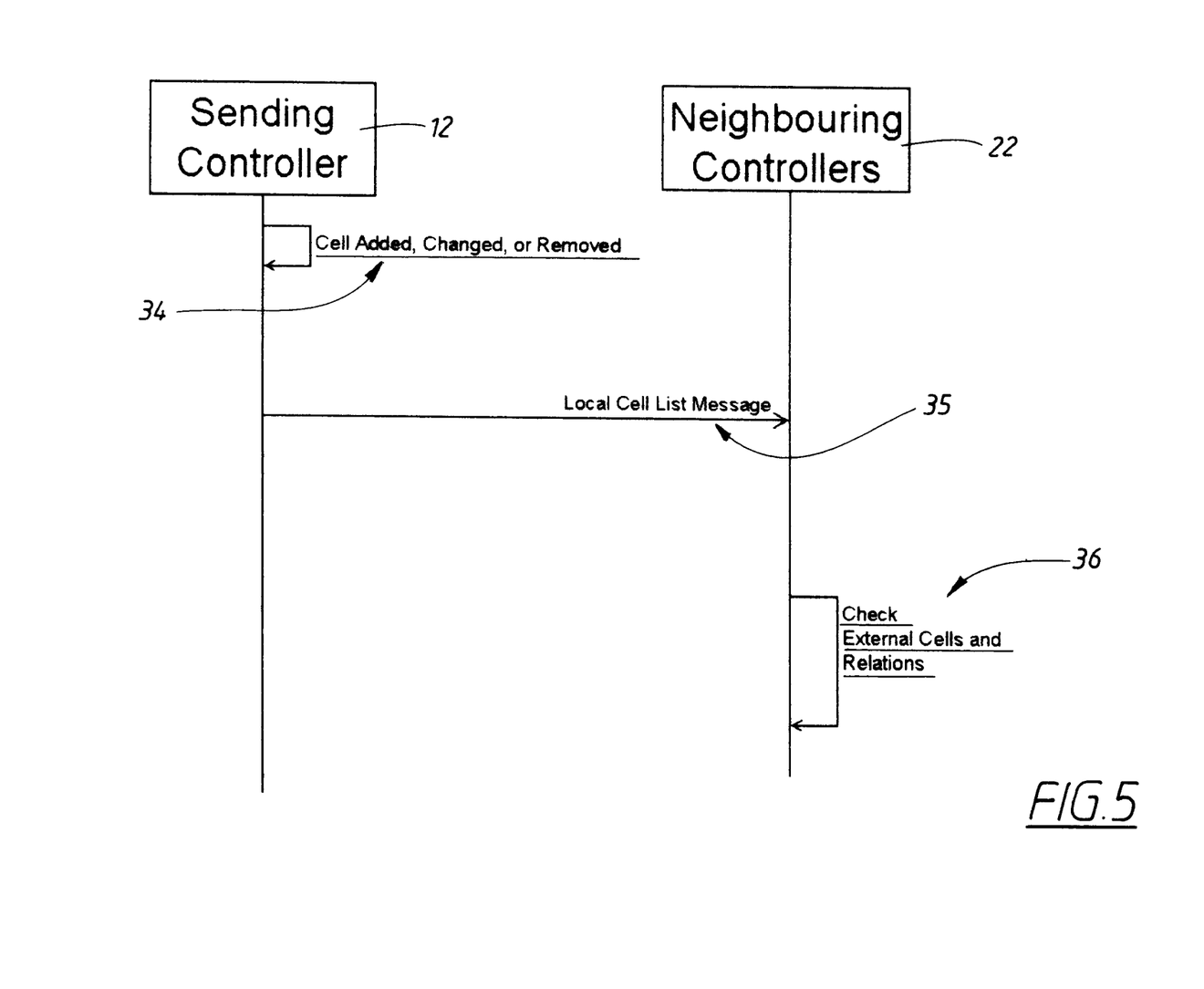
FIG. 5 shows how the controller sends an updated cell list to another controller.

When a controller receives information from another controller about certain cells, it can update (Check External Cells and Relations) 36 the information about the cells in its register means according to above, see FIG. 5.

Wherein when a change is required in the cell information in the register means, the controller 12 further initiates a protocol dialogue with the one or more neighbouring controllers 22 so that the controllers can co-ordinate the change. It may also sends a notify to a network management system for its cellular network, if such a system is present. This dialogue between two controllers is shown in FIG. 6. When the neighbouring controller initiates a change in its cell list 37, such as adding, removing or changing the relationship with an external cell, it sends a message 38 back to the sending controller. This is indicated as an arrow to the left in FIG. 5, with the relevant name of the change. The sending controller (see arrows pointing to the right) sends a reply message 39 confirm that it has taken notice of the change, and changed in its own list accordingly.

The invention claimed is:

1. A controller, such as a base station or radio network controller, for a local cellular network or network segment comprising one or more local cells being served by at least one transceiver, the controller communicating with the local cell or cells and comprising:
   - controlling means for controlling said local cell or cells, and for forming, reforming and/or terminating topology, wherein said forming, reforming and/or terminating is controlled by role controllers such as leader role controllers and member role controllers that are contained and run in the controller;
   - register means for registering and sharing information about the local cell or cells and their relationships and also registering and sharing information about one or more external cells within at least one external cellular network or network segment and their relationships with the local cell or cells; and
   - communication means for communicating directly with one or more neighbouring controllers for the external cellular network or network segment, for sharing of the registered information about cells and their relationships,
   - wherein the local cellular network or network segment operates in accordance with a first wireless technology, the external cellular network or network segment operates in accordance with a second wireless technology, and the first wireless technology is different from the second wireless technology.

2. A controller according to claim 1 wherein the controlling means further comprises software for activities including automatically adding, keeping track of and removing cells from the register means.

3. A controller according to claim 2 wherein the software also includes means for co-ordinating said activities between the local controller and neighbouring controllers.

4. A controller according to claim 1 wherein the register means of the controller holds information about the one or more neighbouring controllers for the external cellular network or network segment.

5. A controller according to claim 1 wherein the register means of the controller holds information that specifies the conditions that a cell within an external network or network segment must comply with in order to be registered as an external cell in the register means.

6. A controller according to claim 1 wherein network management software is contained and run on the controller.

7. A controller according to claim 6 wherein:
   - the controlling means being able to form, reform and/or terminate the topology for the management function of controlling, registering and sharing information about cells and their relationships with the neighbouring controller or controllers, and
   - the register means being able to register and share information about the topology for the management function.

8. A controller according to claim 1 wherein the role controllers controls the permission for the controller to perform controlling, registering and sharing information about cells and their relationships with the neighbouring controller or controllers.

9. A local cellular network or network segment comprising a controller, the local cellular network or network segment comprising one or more local cells being served by at least one transceiver, the controller communicating with the local cell or cells and comprising:
   - controlling means for controlling said local cell or cells, and for forming, reforming and/or terminating topology, wherein said forming, reforming and/or terminating is controlled by role controllers such as leader role controllers and member role controllers that are contained and run in the controller;
   - register means for registering and sharing information about the local cell or cells and their relationships and also registering and sharing information about one or more external cells within at least one external cellular network or network segment and their relationships with the local cell or cells; and
   - communication means for communicating directly with one or more neighbouring controllers for the external cellular network or network segment, for sharing of the registered information about cells and their relationships,
   - wherein the local cellular network or network segment operates in accordance with a first wireless technology, the external cellular network or network segment operates in accordance with a second wireless technology, and the first wireless technology is different from the second wireless technology.

10. A local cellular network or network segment according to claim 9 wherein the registering of information about cells and their relationships is for the purpose of transferring communication sessions between neighbouring cells, such as handover or roaming.

11. A local cellular network or network segment according to claim 9 wherein at least one network management system is running on each cellular network and wherein the systems communicate directly or via a common master network management system.

12. A local cellular network or network segment according to claim 9 wherein the communication means comprises software protocols used within the network.

13. A local cellular network or network segment according to claim 9 wherein network management software is contained and run on the controller.

14. A local cellular network or network segment according to claim 13 wherein:
the controlling means is able to form, reform and/or terminate the topology for the management function of controlling, registering and sharing information about cells and their relationships with the neighbouring controller or controllers,
the register means being able to register and share information about the topology for the management function.

15. A local cellular network or network segment according to claim 14 wherein at least one controller is formed into a topological group.

16. A local cellular network or network segment according to claim 15 wherein one controller in the group has the role of a group leader for this group, wherein the group leader coordinates and displays the topology of its group.

17. A local cellular network or network segment according to claim 14 wherein the topology is formed by layered groups forming a hierarchic topology.

18. A local cellular network or network segment according to claim 17 wherein the hierarchic topology is formed, reformed and terminated so that:
topology groups in the lowest layer always comprise controllers for networks or network segments that are geographically adjacent,
groups in the next layer in the topology comprise controllers for networks or network segments that are heterogeneous and are operated by the same network operator,
groups in the next layer in the topology comprise controllers for networks that are operated by different network operators.

19. A local cellular network or network segment according to claim 17 wherein the hierarchic topology is formed, reformed and terminated so that:
groups in the lowest layer in the topology comprise controllers for networks or network segments that are heterogeneous and are operated by the same network operator in a geographic location,
groups in the next layer in the topology comprise controllers for networks or network segments that are operated by the same network operator, grouped into regional or national groups,
groups in the next layer in the topology comprise controllers for networks that are operated by different network operators.

20. A method for a controller for a local cellular network or network segment comprising one or more local cells being served by at least one transceiver, the controller communicating with the local cell or cells by:
controlling said local cell or cells;
controlling operations of forming, reforming and/or terminating topology using role controllers such as leader role controllers and member role controllers, wherein said leader role controllers and member role controllers are contained and run in the controller;
registering and sharing information about the local cell or cells and their relationships and also register and share information about one or more external cells within at least one external cellular network or network segment and their relationships with the local cell or cells; and
communicating directly with one or more neighbouring controllers for the external cellular network or network segment and sharing of the registered information about cells and their relationships,
wherein the local cellular network or network segment operates in accordance with a first wireless technology, the external cellular network or network segment operates in accordance with a second wireless technology, and the first wireless technology is different from the second wireless technology.

21. A method for a controller according to claim 20 wherein when the controller starts or when a local cell is added to or removed from the controller or when the characteristics of a local cell change, the controller sends the registered information with its location and characteristics data to the one or more neighbouring controllers.

22. A method for a controller according to claim 20 wherein when the controller receives registered information with location and characteristics data from a neighbouring cell the controller performs the steps of:
examining the location and the characteristic data for each cell in the registered information received,
determining if that cell should be registered as an external cell in its own registered information, or if that cell is already registered as an external cell should be removed as an external cell,
determining if any cell in the registered information received, which the controller has registered as an external cell in the controller's own registered information, is missing and if so removing the cell from the controller's registered information.

23. A method for a controller according to claim 20 wherein when a change is made in the controller's own registered information, the controller initiates a protocol dialogue with the one or more neighbouring controllers so that the controllers can co-ordinate the change.

* * * * *

UNITED STATES PATENT AND TRADEMARK OFFICE
CERTIFICATE OF CORRECTION

| | | |
|---|---|---|
| PATENT NO. | : 8,306,533 B2 | Page 1 of 1 |
| APPLICATION NO. | : 12/595863 | |
| DATED | : November 6, 2012 | |
| INVENTOR(S) | : Fallon | |

It is certified that error appears in the above-identified patent and that said Letters Patent is hereby corrected as shown below:

In the Specifications:

In Column 2, Line 51, delete "handover" and insert -- handover. --, therefor.

In Column 3, Line 38, delete "controller" and insert -- controller. --, therefor.

In Column 4, Line 53, delete "neighbouring" and insert -- neighboring --, therefor at each occurrence throughout the patent.

In Column 7, Line 62, delete "will known." and insert -- well known. --, therefor.

Signed and Sealed this
Twenty-eighth Day of May, 2013

Teresa Stanek Rea
*Acting Director of the United States Patent and Trademark Office*